(12) United States Patent
Kudo

(10) Patent No.: US 6,919,925 B2
(45) Date of Patent: Jul. 19, 2005

(54) IMAGING APPARATUS AND VIDEO CAMERA, AND METHOD OF REPRODUCING RECORDED INFORMATION PERFORMED BY THE IMAGING APPARATUS OR THE VIDEO CAMERA

(75) Inventor: Toshimichi Kudo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 10/118,836

(22) Filed: Apr. 9, 2002

(65) Prior Publication Data

US 2002/0149682 A1 Oct. 17, 2002

(30) Foreign Application Priority Data

Apr. 16, 2001 (JP) ........................................ 2001-116687

(51) Int. Cl.[7] ............................................. H04N 5/222
(52) U.S. Cl. ............................... 348/231.4; 348/333.06
(58) Field of Search ....................... 348/333.06, 333.05, 348/333.01, 231.4, 231.6, 231.9, 222.1; 358/906, 909.1

(56) References Cited

U.S. PATENT DOCUMENTS

| | | | | |
|---|---|---|---|---|
| 5,070,406 A | * | 12/1991 | Kinoshita ................. | 348/222.1 |
| 5,497,193 A | * | 3/1996 | Mitsuhashi et al. ..... | 348/231.09 |
| 6,122,003 A | * | 9/2000 | Anderson ................ | 348/333.01 |
| 6,137,534 A | * | 10/2000 | Anderson ................ | 348/222.1 |
| 2001/0008421 A1 | * | 7/2001 | Nishimura et al. ......... | 348/232 |
| 2002/0149682 A1 | * | 10/2002 | Kudo ...................... | 348/231.4 |

FOREIGN PATENT DOCUMENTS

| | | |
|---|---|---|
| JP | 08009204 | 1/1996 |
| JP | 11039850 | 2/1999 |

* cited by examiner

Primary Examiner—Aung Moe
(74) Attorney, Agent, or Firm—Cowan, Liebowitz & Latman, P.C.

(57) ABSTRACT

There are provided an imaging apparatus and a video camera which allow an image being recorded and an image being reproduced to be easily discriminated from each other when an already recorded image signal is reproduced while a photographed image signal is being recorded. A recording section records an image signal obtained by an image pickup section on a randomly accessible recording medium, and a reproducing section is capable of reproducing an image signal recorded at a random location on the recording medium while the image signal is being recorded on the recording medium by the recording section. The recording section and the reproducing section are controlled such that the image signal recorded at a random location on the recording medium can be reproduced while the image signal obtained by the image pickup section is being recorded. A first display means and a second display means are controlled such that either the first display means or the second display means displays a first image according to the image signal obtained by the image pickup section while the other displays a second image according to the reproduced image signal.

36 Claims, 10 Drawing Sheets

# IMAGING APPARATUS AND VIDEO CAMERA, AND METHOD OF REPRODUCING RECORDED INFORMATION PERFORMED BY THE IMAGING APPARATUS OR THE VIDEO CAMERA

BACKGROUND OF THE INVENTION

1. Field of the Invention

The present invention relates to an imaging apparatus and a video camera, and a method of reproducing recorded information performed by the imaging apparatus or the video camera, and more particularly, to an imaging apparatus and a video camera that record an information signal on a recording medium as well as reproduce the information signal as recorded information, and a method of reproducing recorded information performed by the imaging apparatus or the video camera.

2. Description of the Related Art

Many conventional video cameras as an imaging apparatus are provided with a viewfinder for viewing an object image. The viewfinder includes optical types and electronic types (hereinafter referred to as "EVF"). Also, if a video camera having an EVF is employed, a reproduced image can be viewed on the main body of the camera only by displaying the reproduced image reproduced from a recording medium on the EVF. Since such viewfinders are adapted to be looked into, the image cannot be shared by a plurality of persons at a time.

Accordingly, video cameras equipped with a liquid crystal panel of a size more than 2 inches have been introduced in recent years, and now video cameras comprised of both a viewfinder and a liquid crystal panel as a unit, as disclosed, for example, in Japanese Laid-open Patent Publication (Kokai) No. 8-9204, have been gaining in popularity. Japanese Laid-open Patent Publication (Kokai) No. 8-9204 also describes switching means for automatically turning off a liquid crystal panel and turning on an EVF when the liquid crystal panel is closed and automatically turning on the liquid crystal panel and turning off the EVF when the liquid crystal panel is opened.

On the other hand, as memory capacity and read/write speed of recording media increase as well as image compressing technology advances, video cassette recorders (VCRs) and video cameras for recording information on disk-shaped recording media such as DVD-RAM, MD, and HDD have been developed and marketed. Particularly, there has been developed a stationary VCR employing a HDD as a recording medium, which has a capability of reproducing already recorded images while recording without interrupting the recording operation, as disclosed in Japanese Laid-open Patent Publication (Kokai) No. 11-39850. Although this function cannot be achieved in conventional apparatuses using video tapes, it may be realized in apparatuses using certain randomly accessible disk media.

However, among the video cameras as described above in which both an EVF and a liquid crystal panel are provided as a unit, there is no such a video camera having an identical function to that of the above described stationary VCR employing a HDD, i.e., the function of reproducing already recorded moving images while recording images without interrupting the recording operation. Therefore, the development of a video camera having such a function is desired.

SUMMARY OF THE INVENTION

It is a first object of the present invention to solve the above described problem.

It is a second object of the present invention to allow an image being recorded and an image being reproduced to be easily recognized in a manner being discriminated from each other when an already recorded image signal is reproduced while a photographed image signal is being recorded.

It is a third object of the present invention to prevent audio information being reproduced together with an image signal recorded at a random location on a recording medium from being recorded when the image signal is reproduced while an image signal is being recorded.

It is a fourth object of the present invention to allow an image signal to be recorded in random timing without interrupting the recording while an image signal recorded on a recording medium is being reproduced.

To attain the first and second objects, in a first aspect of the present invention, there is provided an imaging apparatus comprising image pickup means, recording means for recording a first image signal obtained by the image pickup means on a randomly accessible recording medium, reproducing means capable of reproducing a second image signal recorded at a random location on the recording medium while the first image signal is being recorded on the recording medium by the recording means, first display means, second display means, and control means for controlling the recording means and the reproducing means such that the second image signal recorded at a random location on the recording medium is reproduced while the first image signal obtained by the image pickup means is being recorded, the control means further controlling the first display means and the second display means such that one of the first display means and the second display means displays a first image according to the first image signal obtained by the image pickup means and the other displays a second image according to the second image signal reproduced by the reproducing means.

In a typical preferred embodiment, the first display means comprises one of an electronic viewfinder and a liquid crystal display means foldably attached to the main body of the apparatus, and the second display means comprises the other.

In a preferred form of the display control, the control means controls the liquid crystal display means to display the second image while controlling the electronic viewfinder to display the first image.

Preferably, the imaging apparatus according to the first aspect further comprises movement detecting means for detecting whether the liquid crystal display means has been moved into a viewing position in which an image displayed by the liquid crystal display means is visible, wherein the control means is responsive to the movement detecting means detecting that the liquid crystal display means has not been moved into the viewing position, for inhibiting the second image from being displayed while the first image signal is being recorded.

Also preferably, the imaging apparatus according to the first aspect further comprises movement detecting means for detecting whether the liquid crystal display means has been moved into a viewing position in which an image displayed by the liquid crystal display means is visible, wherein the control means is responsive to the movement detecting means detecting that the liquid crystal display means has not been moved into the viewing position, for inhibiting the reproducing means from reproducing the second image signal while the first image signal is being recorded.

Preferably, the imaging apparatus according to the first aspect further comprises selecting means for selecting an image signal to be displayed on the first display means and an image signal to be displayed on the second display means out of the first image signal obtained by the image pickup means and the second image signal reproduced by the reproducing means.

In a preferred form of the display control, the control means is responsive to an instruction to start reproduction while the first image signal obtained by the image pickup means is being recorded on the recording medium, for controlling the first display means and the second display means such that an image to be displayed on the first display means is switched from the first image to the second image and the first image is displayed on the second display means.

Preferably, in this case, the control means controls the reproducing means to automatically stop reproduction of the second image signal recorded on the recording medium a predetermined period of time after issuance of the instruction to start reproduction.

In a further preferred form of the display control, the control means is responsive to an instruction to stop reproduction of the second image signal recorded on the recording medium, for controlling the first display means and the second display means such that the second display means stops displaying the first image and an image to be displayed on the second display means is switched from the second image to the first image.

To attain the first and second objects, the first aspect of the present invention also provides a method of reproducing recorded information, executed by an imaging apparatus comprising image pickup means, recording means for recording a first image signal obtained by the image pickup means on a randomly accessible recording medium, reproducing means capable of reproducing a second image signal recorded at a random location on the recording medium while the first image signal is being recorded on the recording medium by the recording means, first display means, and second display means, the method comprising the steps of controlling the recording means and the reproducing means such that the second image signal recorded at a random location on the recording medium is reproduced while the first image signal obtained by the image pickup means is being recorded, and controlling the first display means and the second display means such that one of the first display means and the second display means displays a first image according to the first image signal obtained by the image pickup means and the other displays a second image according to the second image signal reproduced by the reproducing means.

To attain the first and third objects, in a second aspect of the present invention, there is provided an imaging apparatus comprising image pickup means, a microphone for capturing audio information, recording means for recording a first image signal obtained by the image pickup means and audio information captured by the microphone on a randomly accessible recording medium, reproducing means capable of reproducing a second image signal and audio information corresponding to the second image signal recorded at a random location on the recording medium while the first image signal is being recorded on the recording medium by the recording means, audio output means for externally outputting the audio information reproduced by the reproducing means, and control means for controlling the audio output means to inhibit the audio information reproduced by the reproducing means from being externally outputted while the first image signal is being recorded by the recording means.

In a typical preferred form of the second aspect, the audio output means comprises a speaker for outputting the reproduced audio information, and an external output terminal for externally outputting the audio information, and wherein the control means controls the audio output means to inhibit the audio information reproduced by the reproducing means from being outputted by the speaker while the first image signal is being recorded by the recording means and to permit the reproduced audio information to be outputted from the external output terminal.

To attain the first and third objects, the second aspect of the present invention also provides a method of reproducing recorded information executed by an imaging apparatus comprising image pickup means, a microphone for capturing audio information, recording means for recording a first image signal obtained by the image pickup means and audio information captured by the microphone on a randomly accessible recording medium, reproducing means capable of reproducing a second image signal and audio information corresponding to the second image signal recorded at a random location on the recording medium while the first image signal is being recorded on the recording medium by the recording means, and audio output means for externally outputting the audio information reproduced by the reproducing means, the method comprising the step of controlling the audio output means to inhibit the audio information reproduced by the reproducing means from being externally outputted while the first image signal is being recorded by the recording means.

To attain the first and fourth objects, in a third aspect of the present invention, there is provided a video camera comprising image pickup means, recording means for recording a first image signal obtained by the image pickup means on a randomly accessible recording medium, reproducing means for reproducing a second image signal recorded on the recording medium, recording start instructing means for instructing start of recording the first image signal obtained by the image pickup means on the recording medium, and control means responsive to an instruction to start recording from the recording start instructing means during reproduction of the second image signal recorded on the recording medium by the reproducing means, for controlling the recording means and the reproducing means such that recording of the first image signal obtained by the image pickup means is started by the recording means while the reproduction by the reproducing means is continued.

Preferably, the video camera according to the third aspect further comprises reproduction start instructing means for instructing start of reproduction of the second image signal recorded on the recording medium, wherein the control means is responsive to an instruction to start reproduction by the reproduction start instructing means during recording of the second image signal, for controlling the recording means and the reproducing means such that the second image signal recorded a predetermined period of time before is reproduced from the recording medium while recording of the first image signal by the recording means is continued.

More preferably, the video camera according to the third aspect further comprises first display means, and second display means, and wherein the control means controls the first display means and the second display means such that one of the first display means and the second display means displays a first image according to the first image signal obtained by the image pickup means and the other displays a second image according to the second image signal reproduced by the reproducing means.

Yet more preferably, the first display means comprises one of an electronic viewfinder and a liquid crystal display means foldably attached to the main body of the video camera, and the second display means comprises the other.

Preferably, the control means controls the liquid display means to display an image according to the second image signal reproduced by the reproducing means while controlling the electronic view finder to display an image according to the first image signal obtained by the image pickup means.

To attain the third object, the video camera according to the third aspect further comprises a microphone for capturing audio information, and audio output means for externally outputting the audio information, and wherein the recording means records the audio information captured by the microphone on the recording medium in correspondence with the first image signal, and the reproducing means reproduces the audio information recorded on the recording medium together with the second image signal corresponding thereto, and wherein the control means controls the audio output means to inhibit the audio information reproduced by the reproducing means from being externally outputted while the first image signal is being recorded by the recording means.

To attain the first and fourth objects, the third aspect of the present invention also provides a method of reproducing recorded information executed by a video camera comprising image pickup means, recording means for recording a first image signal obtained by the image pickup means on a randomly accessible recording medium, reproducing means for reproducing a second image signal recorded on the recording medium, and recording start instructing means for instructing start of recording the first image signal obtained by the image pickup means on the recording medium, the method comprising the step of controlling the recording means and the reproducing means such that recording of the first image signal obtained by the image pickup means is started by the recording means while the reproduction by the reproducing means is continued, in response to an instruction to start recording from the recording start instructing means during reproduction of the second image signal recorded on the recording medium by the reproducing means.

According to the first aspect of the present invention, the recording means and the reproducing means are controlled such that an image signal recorded at a random location on a recording medium is reproduced while an image signal obtained by the image pickup means, and further, the first display means and the second display means are controlled such that one of the first display means and the second display means displays a first image according to the first image signal obtained by the image pickup means and the other displays a second image according to the second image signal reproduced by the reproducing means. As a result, it is possible to allow an image being recorded and an image being reproduced to be easily recognized in a manner being discriminated from each other when an already recorded image signal is reproduced while a photographed image signal is being recorded.

According to the second aspect of the present invention, the audio output means is controlled to inhibit the audio information reproduced by the reproducing means from being externally outputted while the first image signal is being recorded by the recording means. As a result, it is possible to prevent audio information being reproduced together with an image signal recorded at a random location on a recording medium from being recorded when the image signal is reproduced while an image signal is being recorded.

According to the third aspect of the present invention, the recording means and the reproducing means are controlled such that recording of the first image signal obtained by the image pickup means is started by the recording means while the reproduction by the reproducing means is continued, in response to an instruction to start recording from the recording start instructing means during reproduction of the second image signal recorded on the recording medium by the reproducing means. As a result, it is possible to allow an image signal to be recorded in random timing without interrupting the recording while an image signal recorded on a recording medium is being reproduced.

The above and other objects, features, and advantages of the invention will become more apparent from the following detailed description taken in conjunction with the accompanied drawings.

DETAILED DESCRIPTION OF PREFERRED EMBODIMENTS

Figure 1:
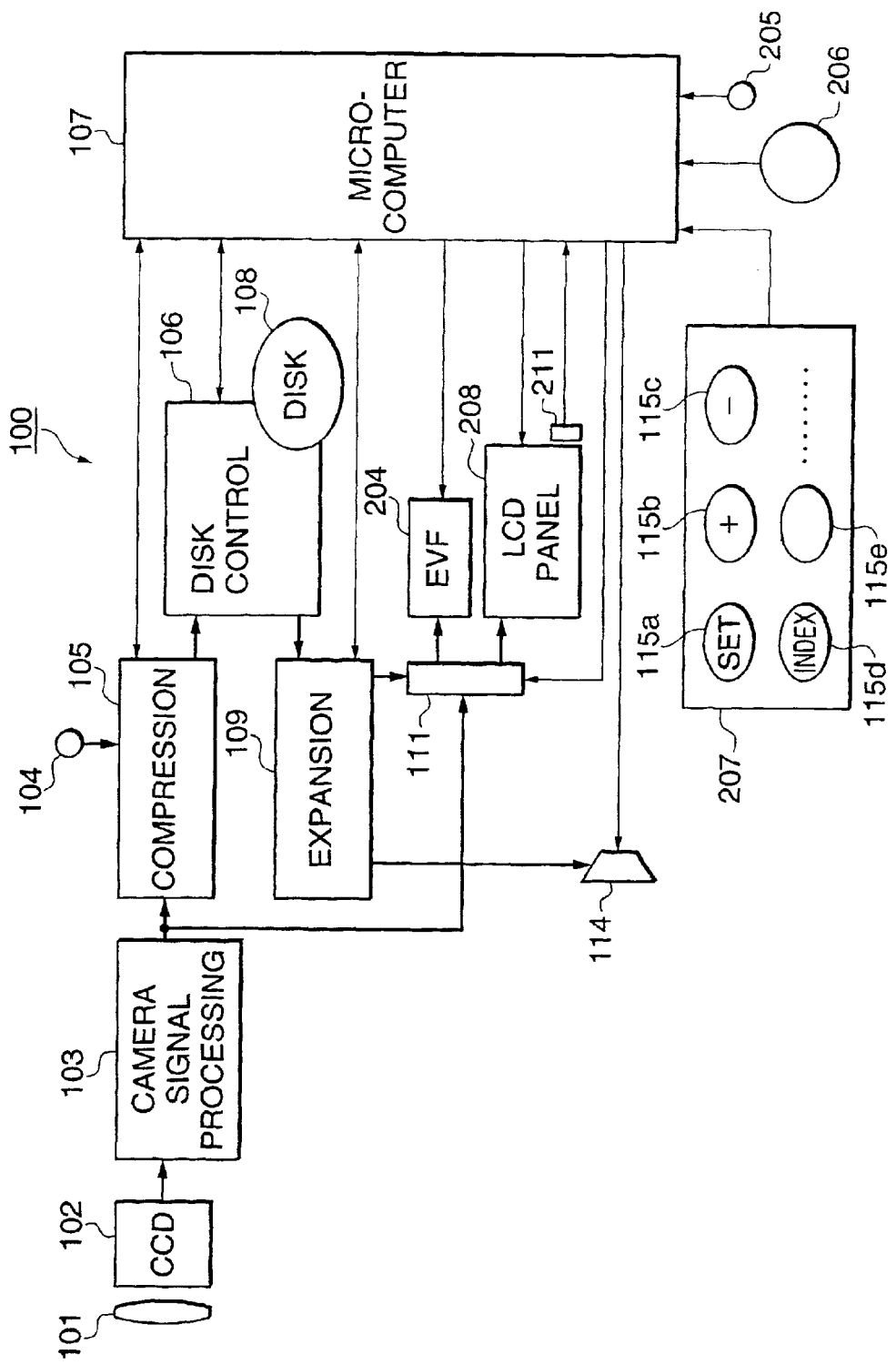
FIG. 1 is a block diagram showing the internal configuration of a video camera according to a first embodiment of the present invention.
Figure 2:
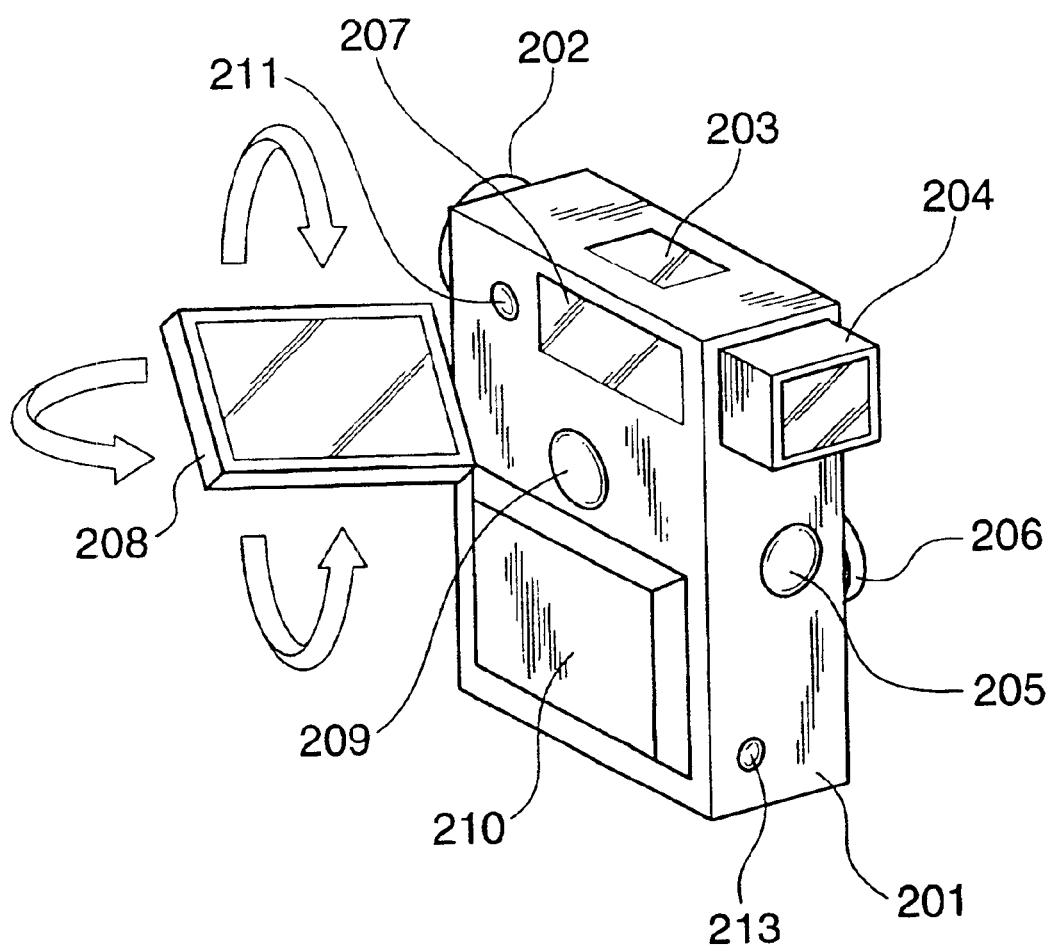
FIG. 2 is a perspective view showing the appearance of the video camera in FIG. 1.
Figure 3:
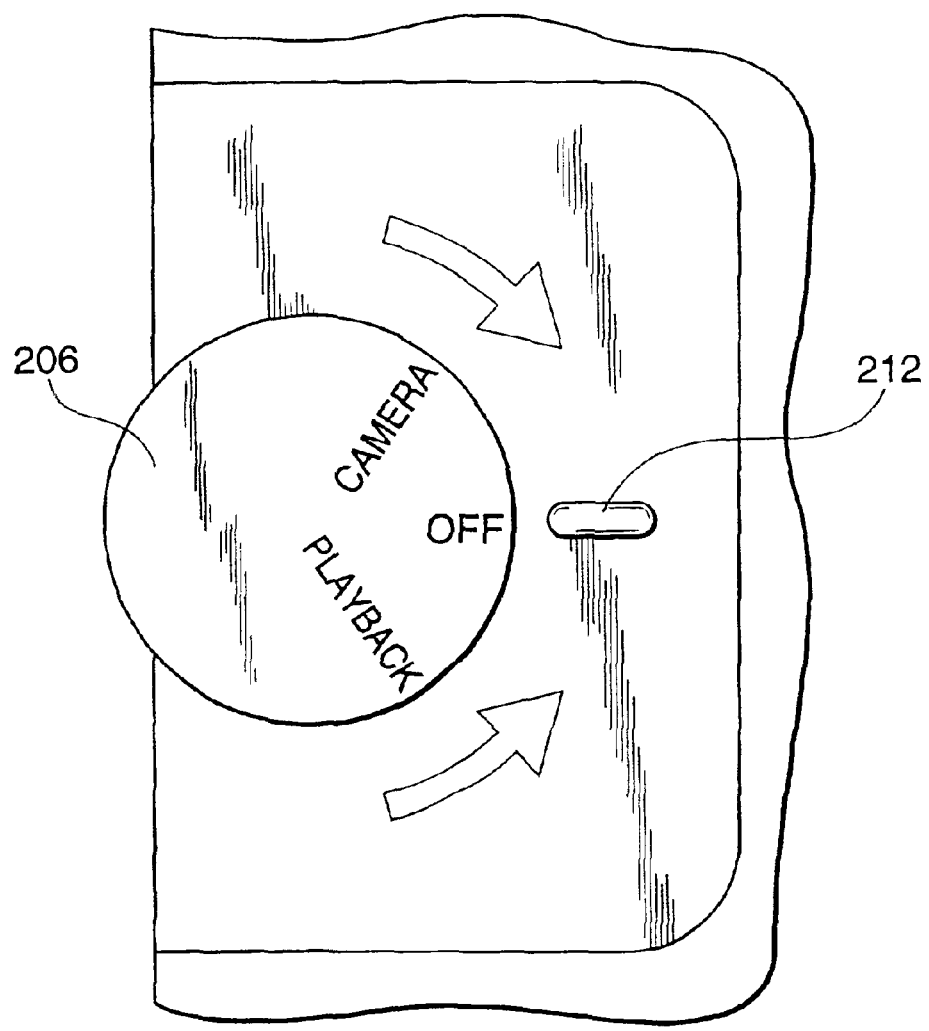
FIG. 3 is a fragmentary view showing a mode dial provided on the video camera in FIG. 2.
Figure 4:
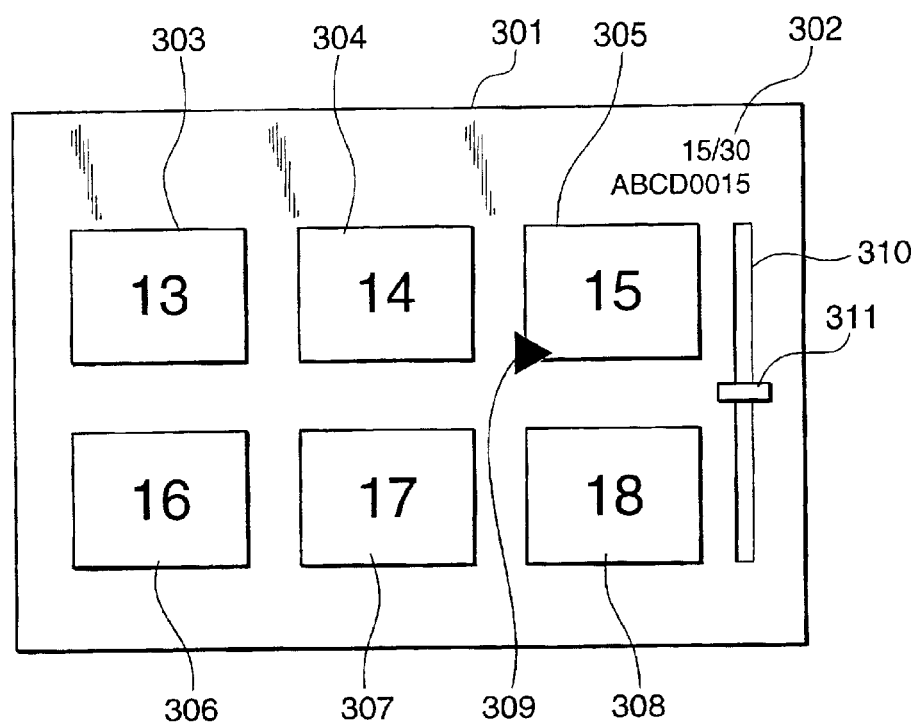
FIG. 4 is a diagram showing an example of an index screen displayed on a liquid crystal panel of the video camera 100 in FIG. 1.

The present invention will now be described below with reference to the accompanying drawings showing preferred embodiments thereof.
First Embodiment FIG. 1 is a block diagram showing the internal configuration of a video camera 100 according to a first embodiment of the present invention; FIG. 2 is a perspective view showing the appearance of the video camera 100 in FIG. 1; FIG. 3 is a fragmentary view showing a mode dial provided on the video camera 100 in FIG. 2; and FIG. 4 is an example of an index screen displayed on a liquid crystal panel of the video camera 100 shown in FIG. 1.

The video camera 100 according to the first embodiment, as shown in FIG. 2, has a main body 201 in which is accommodated a randomly accessible recording medium (not shown) such as a hard disk or a magnetic optical disk. The video camera 100 records information such as image data compressed and coded according to MPEG (Moving Picture Experts Group) or audio data in the recording medium, or reproduces recorded information thus stored in the recording media. In the first embodiment, a magnetic optical disk is used as the recording medium.

The main body of the video camera 201 includes an image pickup section 202 for capturing an object image, a microphone 203 for collecting sound during shooting, an EVF 204 for viewing an object image taken, a trigger switch 205 which is an operating switch for instructing start or stop of shooting, a mode dial 206 for setting a mode, a group of operating switches 207 including keys for operation of a reproduction system, a menu operation and others, a liquid crystal panel 208, a speaker 209, a battery 210 detachable from the main body of the camera 201, and an external output terminal 213 such as a headphones jack.

The EVF 204 is an electronic viewfinder which may be turned off by a control, described later.

The mode dial 206 is, as illustrated in FIG. 3, a rotary operating switch on which are indicated operating positions including "PLAYBACK" for setting the video camera 100 in reproduction mode, "CAMERA" for setting the video camera 100 in camera mode, and "OFF" for setting the video camera 100 in off mode. To set modes, users rotate the mode dial 206 so that any one of those operating positions aligns with a bar 212 marked on the main body of the camera 201. Thus, the mode corresponding to the operating position aligned with the bar 212 is established.

In the reproduction mode described above, a recorded image recorded on a recording medium can not only be reproduced but can also be edited or erased. Also, in the camera mode, shooting can be primarily carried out. In the off mode, the main power supply of the video camera 100 can be switched off.

The liquid crystal panel 208, which is attached to the main body of camera 201, displays an object image such that it can be viewed in the same way as the EVF 204 during shooting, and displays mainly a reproduced recorded image during reproduction. The liquid crystal panel 208 can again be turned off as with the EVF 204.

In addition, the liquid crystal panel 208 is constructed such that it can be folded out from the main body of the camera 201, and is further vertically rotatable when it is in an unfolded or open position. When the liquid crystal panel 208 is closed, this state is electrically detected by a panel open/closed detection switch 211. For example, in the liquid crystal panel 208, a protrusion (not shown) which pushes or depresses the panel open/closed detection switch 211 may be provided on the liquid crystal panel 208 such that the protrusion depresses the panel open/closed detection switch 211 when the liquid crystal panel 208 is closed, and the depression of the panel open/closed detection switch 211 by the above protrusion is released when the liquid crystal panel 208 is open. This enables the control system to recognize the open/closed status of the liquid crystal panel 208.

The group of operating switches 207 are arranged at such a location that they cannot be operated with the liquid crystal panel 208 closed. The details of the switches included in the group of operating switches 207 will be described later.

The internal configuration of the video camera 100 will be described below with reference to FIG. 1.

The video camera 100, as shown in FIG. 1, is comprised of a microcomputer 107 which controls the entire system including a recording system and a reproducing system. The microcomputer 107 is comprised of a ROM storing control programs, a RAM, and a CPU.

The recording system has a lens unit 101 included in the image pickup section 202, and a microphone unit 104 including the microphone 203. The lens unit 101 is comprised of a group of fixed lenses for condensing light, a group of magnification varying lenses, a diaphragm, and a group of compensation lenses having both a function of compensating an image forming position moved with the movement of the magnification varying lenses and a function of carrying out focusing. An object image is eventually formed on the imaging plane of a CCD (Charge Coupled Device) 102 by the lens unit 101 composed of these groups of lenses.

The CCD 102 converts the image information of the object image as a light image formed on the imaging plane into electric charge to generate an image signal. The image signal from the CCD 102 is inputted to a signal processing section 103, then the signal processing section 103 carries out predetermined processing on the input image signal and outputs the resulting digital image data. The microphone unit 104 is comprised of an amplifier for amplifying an audio signal captured through the microphone 203, a band limit filter, an A/D converter, etc. and outputs digital audio data.

The digital audio data from the microphone unit 104 is inputted to a compressing section 105 together with the digital image data from the camera signal processing section 103.

The compressing section 105 carries out MPEG compression-coding processing on the digital image data and digital audio data in real time and outputs a coded data in which the coded image data and coded audio data are multiplexed. The coded data row outputted from the compressing section 105 is written into a disk 108 which is a randomly accessible magnetic optical disk by a disk control section 106. The disk control section 106 controls the write and read of coded data rows to and from the disk 108.

The reproducing system has an expanding section 109 which performs reproduction, i.e., decoding the coded data rows read from the disk 108 through the disk control section 106 to expand the information amount and to convert them into image data and audio data, and outputs the reproduced image data to an image input selecting switch 111 and the reproduced audio data to a speaker unit 114, respectively.

The image input selecting switch 111 selects and outputs either digital image data from the camera signal processing section 103 or image data (reproduced image data) from the expanding section 109, or both of them under the control of the microcomputer 107.

In other words, the image input selecting switch 111 has two-channel outputs corresponding to the EVF 204 and the liquid crystal panel 208, and is capable of separately controlling the image data to be outputted to each of the channels. This enables the image data from the camera signal processing section 103 to be displayed on the EVF 204 and on the liquid crystal panel 208 separately and concurrently, or allows the image data (reproduced image data) from the expanding section 109 to be displayed on the liquid crystal panel 208 while the image data from the camera signal processing section 103 is being displayed on the EVF 204.

The EVF 204 and the liquid crystal panel 208 have separate power supplies from each other and are capable of turning on and off the power independent of the entire system under the control of the microcomputer 107. Also, the open/closed status of the liquid crystal panel 208 is recognized by the microcomputer 107 based on the detection signal from the panel open/closed detection switch 211.

The speaker unit 114, which is comprised of a speaker 209 and an external output terminal 213, receives audio data from the expanding section 109 when the coded data rows from the disk 108 are reproduced, drives the speaker 209 to output the audio data as sound, and outputs the audio data through the external output terminal 213. In addition, the speaker unit 114 has a capability of varying the volume under the control of the microcomputer 107.

Signals from each of the operating switches 207, the trigger switch 205 and the mode dial 206 are inputted to the microcomputer 107. The microcomputer 107 performs the control of the entire system of the video camera 100 as well as processing on individual components based on these signals.

The group of operating switches 207 includes a set key 115a for determining and operating an item selected on the menu and others, a plus key 115b and a minus key 115c for selecting one from a plurality of options on the menu and others, an index key 115d for displaying an index screen on the liquid crystal panel 208, and a camera-mode reproduction key 115e for reproducing coded data rows recorded on the disk 108 in camera mode.

The mode dial 206 is a switch for selecting a mode from the reproduction, camera and off modes, and the trigger switch 205 is a switch for generating a recording start/stop event every time it is operated in camera mode as well as generating a recording start/stop event every time it is operated in reproduction mode.

When the index key 115d is operated, as shown in FIG. 4, an index screen 301 indicating the recorded image data stored in the disk 108 appears on the screen of the liquid crystal panel 208. The index screen 301 displays thumbnail images 303 to 308 corresponding, respectively, to a plurality of video clips recorded on the disk 108.

One video clip described herein means a group of coded data rows from the start of recording prompted by an operation of the trigger switch 205 to the completion of recording by another operation of the trigger switch 205 when shooting is performed, and thus forms a basic unit (file) to be recorded on the disk 108.

Further, a thumbnail image corresponding to a video clip is a representative picture representing the video clip, such as an initial image taken at the beginning of recording and reduced properly in size. In FIG. 4, numbers "13" to "18" are displayed as simplified indications of the thumbnail images 303 through 308 representing the respective video clips.

The index screen 301 displays a cursor 309 which can be moved on the screen by operating the plus key 115b and the minus key 115c. On this index screen 301, the cursor 309 can be moved to select a index image corresponding to a desired video clip out of the thumbnail images 303 to 308 corresponding to the respective the video clips.

FIG. 4 shows a screen status where the thumbnail image 305 is selected by the cursor 309. Also displayed on the index screen 301 is video clip information 302 as information on the video clip corresponding to the selected thumbnail image 305.

The information displayed in the upper row of the video clip information 302 includes information indicating where the currently selected video clip is found among all the video clips recorded on the disk 108 by predetermined sorting. FIG. 4 shows the video clip corresponding to the selected thumbnail image 305 is found 15th out of the 30 video clips recorded on the disk 108. The predetermined sorting means a sort by the recorded time, by name, etc.

In the lower row of the video clip information 302, the name or part of the name of the video clip corresponding to the thumbnail image 305 "ABCD0015" is displayed. However, the name is given according to predetermined rules such as DCF (Design Rule for Camera File System) established by Japan Electronic Industries Development Association, and can uniquely specify any one of the video clips recorded on the disk 108.

The index screen 301 also includes a slider 310 and a pointer 311 which provide an image indicative of where the video clips corresponding to the currently indicated thumbnail image 303 to 308 is located on the entire index screen 301.

Other than the above, a variety of information may be displayed including remaining battery power capacity, whether the disk 108 is loaded, and so on, on the index screen 301.

With the thumbnail image 305 selected by the cursor 309 on the index screen 301 described above, the cursor 309 moves toward the thumbnail images 306, 307 each time the plus key 115b is operated and moves toward the thumbnails 304, 303 each time the minus key 115c is operated. The indication of the video clip information 302 and the position of the pointer 311 change with the movement of the cursor 309. In addition, if the cursor 309 is moved to select a thumbnail image corresponding to a video clip before the thumbnail image 303 or after the thumbnail image 308, the screen scrolls.

When the set key 115a is operated, displaying of the video clip image corresponding to the thumbnail image selected by the cursor 309 at that time is started and the video clip image is reproduced. When the reproduction of the image is completed, then the display screen turns back to the index screen 301. Furthermore, if the index key 115d is operated again, this index screen image is cleared.

The switching of the display screen as described above is fully controlled by the microcomputer 107.

Since, in the first embodiment, this series of functions of displaying the index screen 301 and selecting and reproducing a desired video clip can be achieved not only in reproduction mode but also in camera mode, the image data from the disk 108 can be reproduced and displayed even while image data signals from the image pickup section 202 and audio data signals from the microphone unit 104 are being recorded without interrupting the recording operation.

In addition, since, in the video camera 100 according to the first embodiment, the operating switches 207 are disposed such that they cannot be operated when the liquid crystal panel 208 is closed, the reproduction during recording is enabled only when the liquid crystal panel 208 is open.

Operations in camera mode in the first embodiment will be described below with reference to FIG. 5 and FIG. 6.

Figure 5:
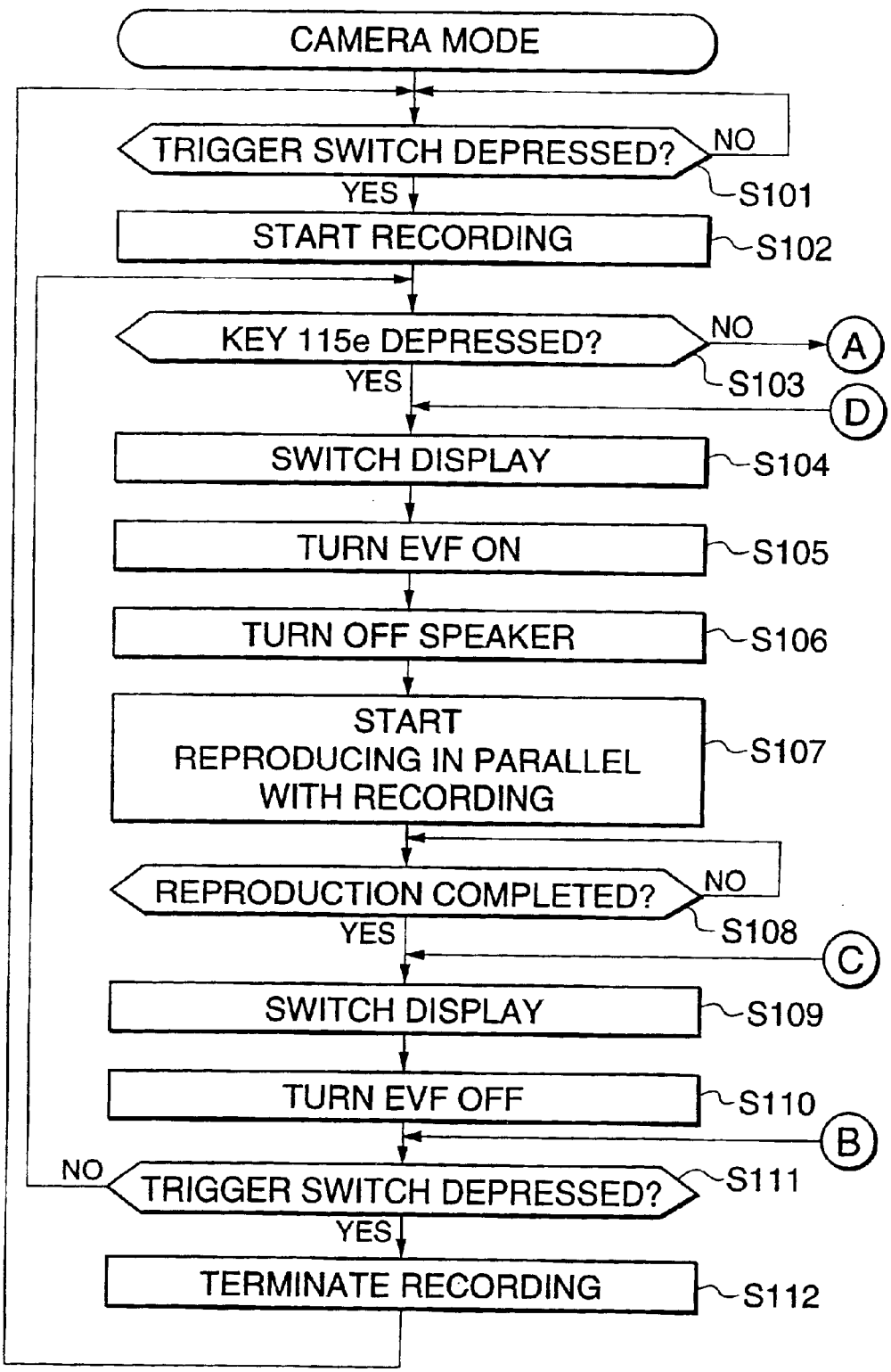
FIG. 5 is a flow chart showing a procedure carried out in camera mode in the video camera in FIG. 1.
Figure 6:
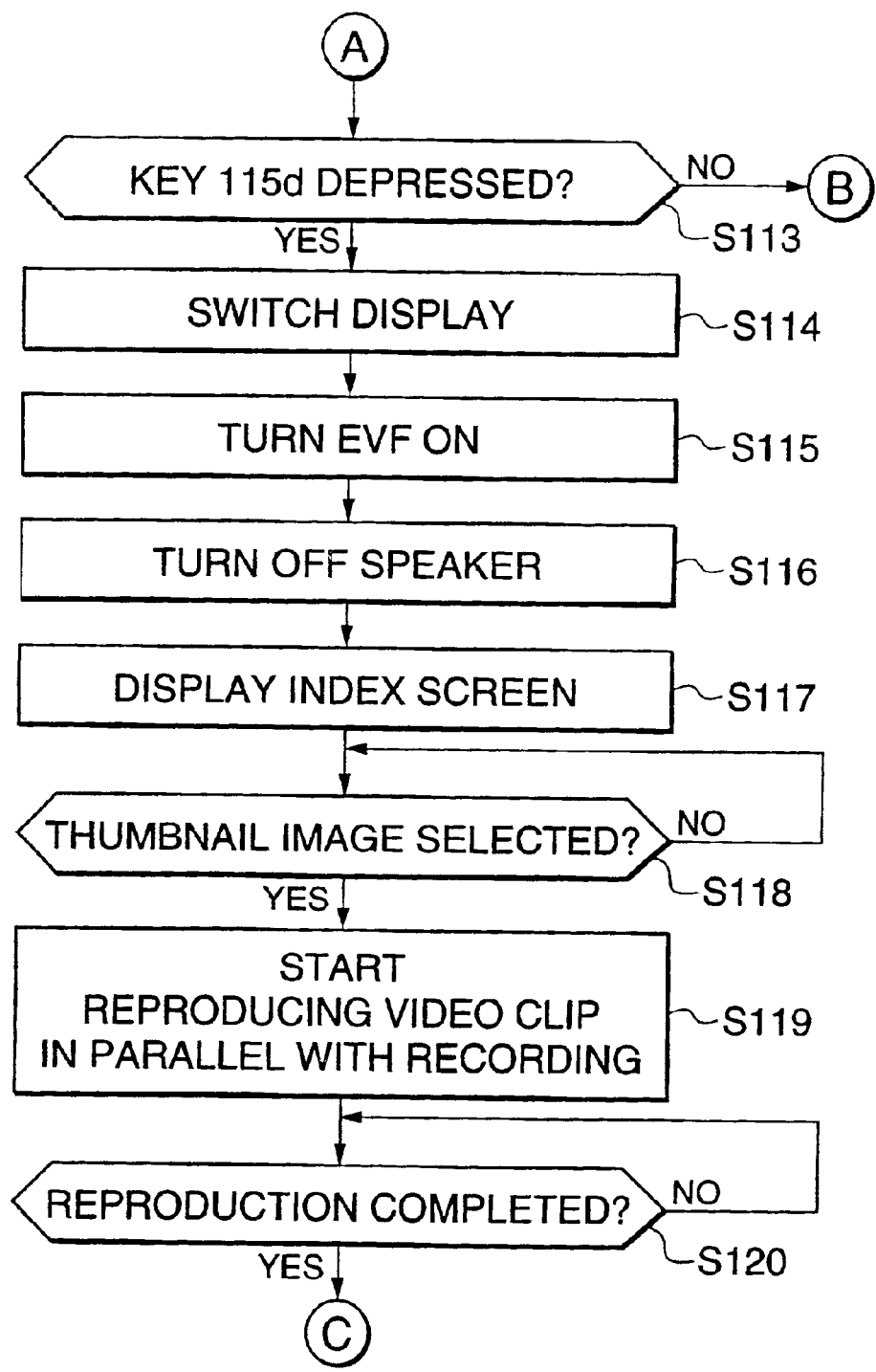
FIG. 6 is a flow chart showing a continued part of the flow chart in FIG. 5.

FIG. 5 and FIG. 6 are flow charts illustrating a procedure performed by the microcomputer 107 in camera mode.

According to the first embodiment, as mentioned above, it is possible to reproduce coded data stored at random locations on the disk 108 during shooting. Further, to reproduce the coded data during shooting, it is controlled such that an image representing the image data obtained from the image pickup section 202 and currently being recorded is displayed on the EVF 204, and an image representing the image data reproduced from the disk 108 is displayed on the liquid crystal panel 208, respectively,.

Also, in the first embodiment, it is required that the liquid crystal panel 208 is open for the image data from the disk 108 to be reproduced during shooting. This is because the operating switches 207 are arranged at such a location that they cannot be operated when the liquid crystal panel 208 is closed.

To start recording, the user first selects the camera mode using the mode dial 206 and folds out the liquid crystal panel 208. Then, the microcomputer 107 recognizes that the liquid crystal panel 208 is open, based on the detection signal from the panel open/closed detection switch 211, powers off the EVF 204 and powers on the liquid crystal panel 208. In addition, the microcomputer 107 controls the image input selecting switch 111 to select the camera image signal for both of the two channels and provides the image signal to the EVF 204 and the liquid crystal panel 208.

When these conditions are fulfilled, the flow in FIG. 5 is started.

The microcomputer 107 first monitors the operation of the trigger switch 205 in step S101, and when the trigger switch 205 is thus operated, determines that start of recording has been requested and starts recording in step S102. Then, it is determined whether the camera-mode reproduction key 115e has been operated, or pressed, in step S103.

When the camera-mode reproduction key 115e is operated, the process proceeds to step S104, where the image input selecting switch 111 is controlled to switch the display images of the EVF 204 and the liquid crystal panel 208 such that the image data (captured image) from the camera signal processing section 103 is fed to the EVF 204 and the image data (reproduced image) from the expanding section 109 is fed to the liquid crystal panel 208, and then the power of the EVF 204 is turned on in step S105.

Then, in step S106 the speaker 209 of the speaker unit 114 is turned off so that no sound of the audio data reproduced from the disk 108 will be outputted. Turning off the speaker 209 impedes the reproduced sound from being outputted to the outside and hence can prevent the reproduced sound from being picked up by the microphone 104 and recorded. Although the speaker 209 is thus turned off, the external output terminal 213 included in the speaker unit 114 is held in a state that the reproduced sound is ready for outputting through the terminal 213. Therefore, the user can listen to the reproduced sound by connecting headphones or the like to the external output terminal 213.

Then, the process proceeds to step S107, where the reproduction of the coded data row is carried out starting with the coded data row recorded a predetermined time period earlier than the present time. In the first embodiment, for example, the reproduction is started with the coded data row recorded ten seconds earlier than the present time and stopped after reproducing for ten seconds. The image according to the reproduced image data is displayed on the liquid crystal panel 208 and the reproduced audio data is outputted to the external output terminal 213 as described above. Also, the image according to the image data obtained from the image pickup section 202 is displayed on the EVF 204. Thus, an image recorded a predetermined time period before can be viewed while shooting is continuously performed. Then in step S108, completion of the reproduction is waited for, and after the reproduction is completed, the process proceeds to step S109.

In step S109, the image input selecting switch 111 is controlled to switch the display status so that the image data from the camera signal processing section 103 is fed to the liquid crystal panel 208 to be displayed thereon, and then in the following step S110, the power of the EVF 204 is turned off. Then in step S111, it is determined whether the trigger switch 205 has been operated, or depressed.

If the trigger switch 205 has not been operated, the process goes back to the step S103 to get ready for the next request for reproduction (depression of the camera-mode reproduction key 115e or the index key 115d) while continuing recording. If the trigger switch 205 has been operated, it is determined that termination of recording has been requested, and then the termination of recording is performed in step S112, and then the process returns to the step S101 to prepare for the next instruction for recording.

Also, if it is determined that the camera-mode reproduction key 115e has not been operate in the step S103, the process proceeds to step S113 shown in FIG. 6, where it is determined whether the index key 115d has been operated, or depressed.

If the index key 115d has been depressed, the process proceeds to step S114, where the image input selecting switch 111 is controlled to switch the display images of the EVF 204 and the liquid crystal panel 208 so that the image data from the camera signal processing section 103 is fed to the EVF 204 to be displayed thereon and the image data from the expanding section 109 is fed to the liquid crystal panel 208 to be displayed thereon, and then in step S115 the power of the EVF 204 is turned on. Then in step S116, the speaker 209 of the speaker unit 114 is turned off to inhibit the output of the reproduced sound so that the reproduced sound cannot be picked up by the microphone unit 104.

Then, the process proceeds to step S117, where the disk control section 106 is controlled to reproduce the thumbnail image data of each of the video clips recorded in the predetermined recording area of the disk 108, process the thumbnail image data in the expanding section 109 and display an index screen similar to that shown in FIG. 4 on the liquid crystal panel 208. In the following step S118, selection of a thumbnail image corresponding to the video clip to be reproduced on the index screen is waited for, and when the thumbnail image corresponding to the video clip is chosen, the process proceeds to step S119.

In the step S119, the disk control section 106 is controlled to start reproducing the video clip corresponding to the selected thumbnail image from the disk 108 in parallel with recording. In the following step S120, completion of the reproduction of the video clip corresponding to the selected thumbnail image is waited for. Controlling in this way allows a video clip corresponding to a thumbnail image selected on the index screen and being reproduced to be displayed on the liquid crystal panel 208 in parallel with shooting. When the reproduction is completed, the process returns to the step S109.

If the index key 115d is not operated in the step S113, the process returns to the step S111.

According to the first embodiment, as described above, if an unidentified object is found passing by across the field of view, while shooting a desired object with the video camera fixed on a tripod stand, for example, the operator can reproduce the scene in which the unidentified object appears and easily confirm what the unidentified object is by depressing the camera-mode reproduction key 115e without interrupting recording. Further, while shooting a desired object with the video camera fixed on a tripod stand, for example, the user can also playback a video clip taken before, which includes similar scenes, and can therefore carrying out shooting while comparing the reproduced picture with the picture being recorded.

Second Embodiment

A second embodiment of the present invention will be described below.

Figure 7:
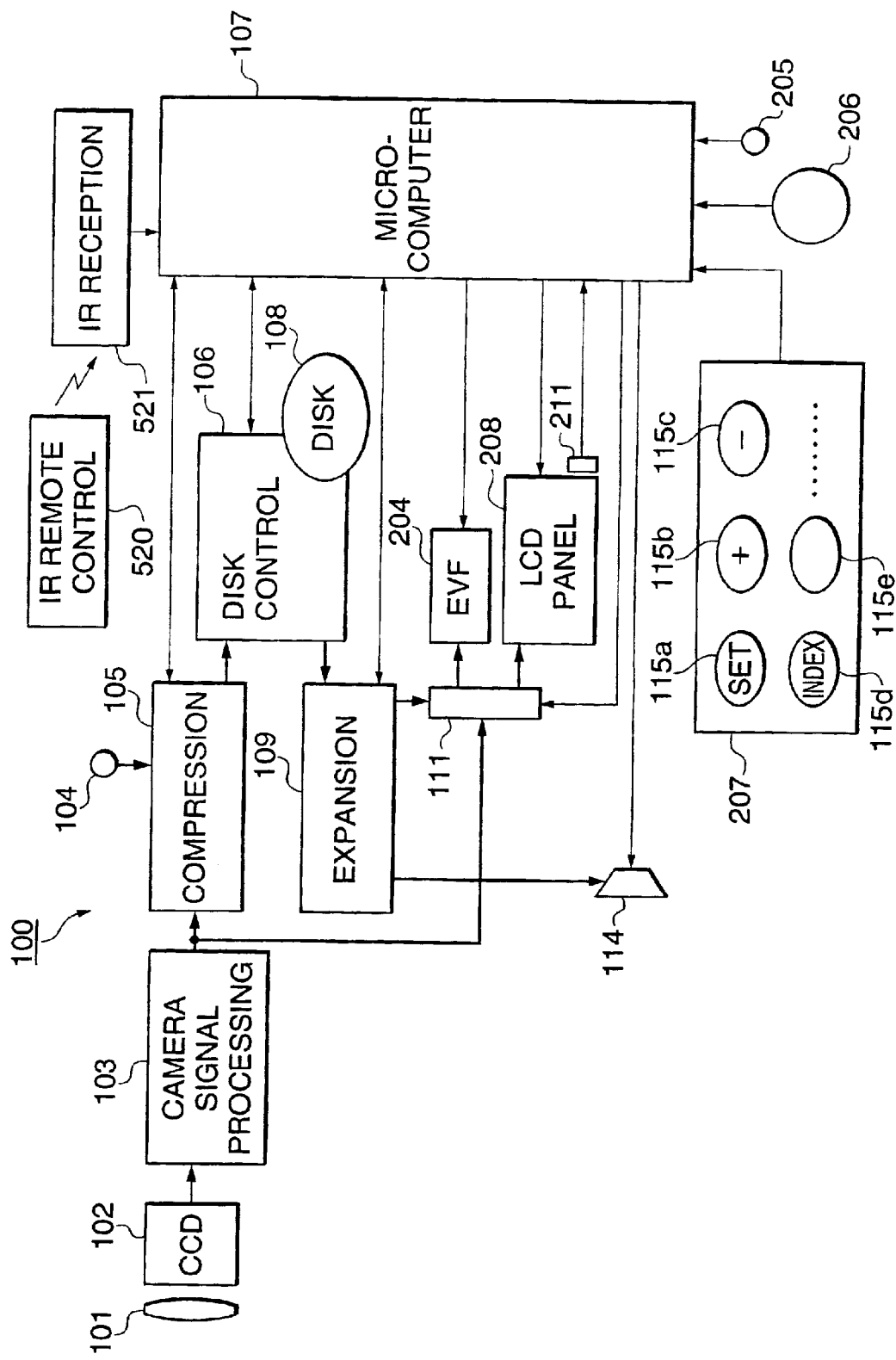
FIG. 7 is a block diagram showing the internal configuration of a video camera according to a second embodiment of the present invention.
Figure 8:
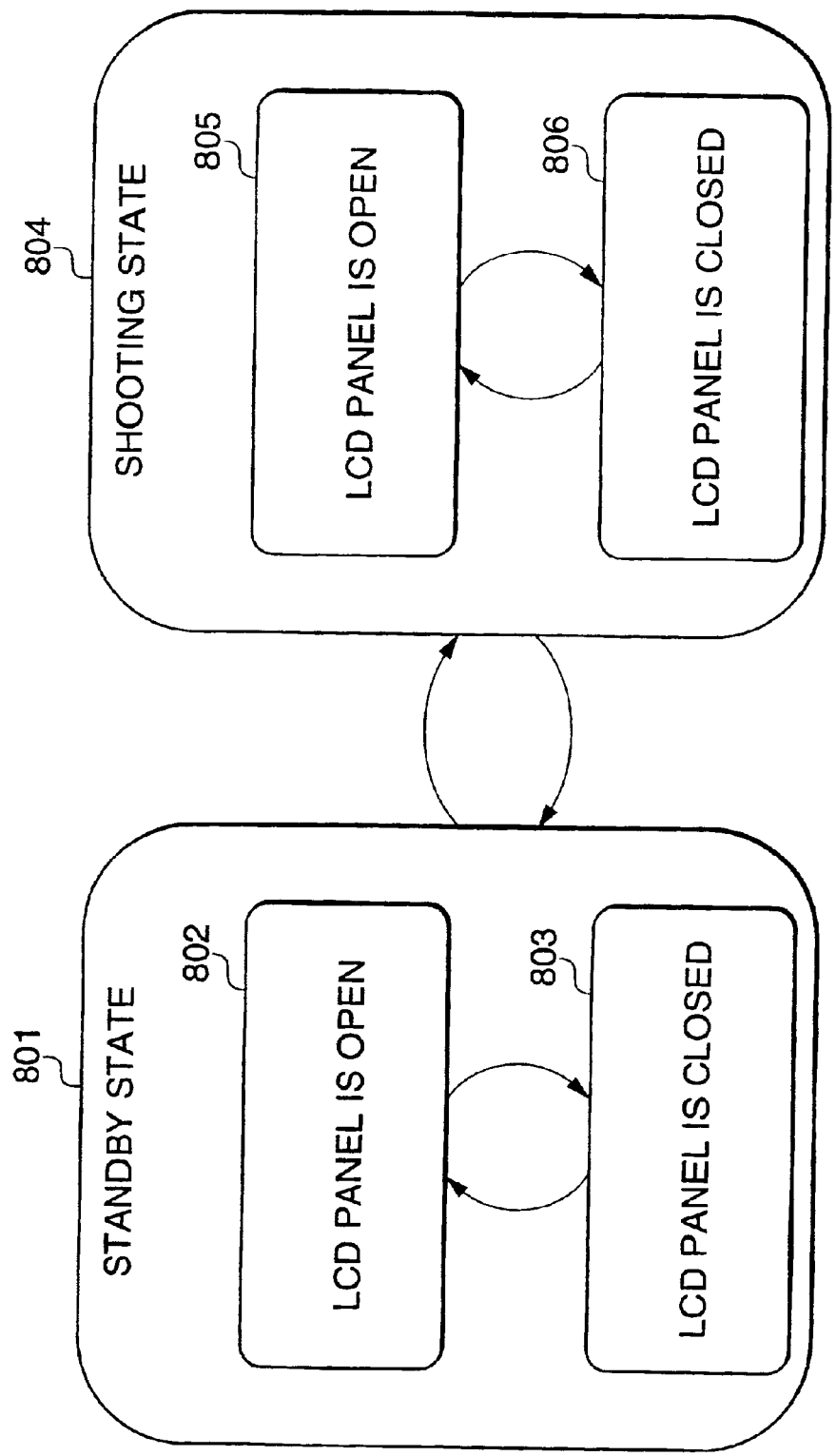
FIG. 8 is a diagram showing a state transition of display control in a case where a reproduction request is made in camera mode in the video camera in FIG. 7.
Figure 9:
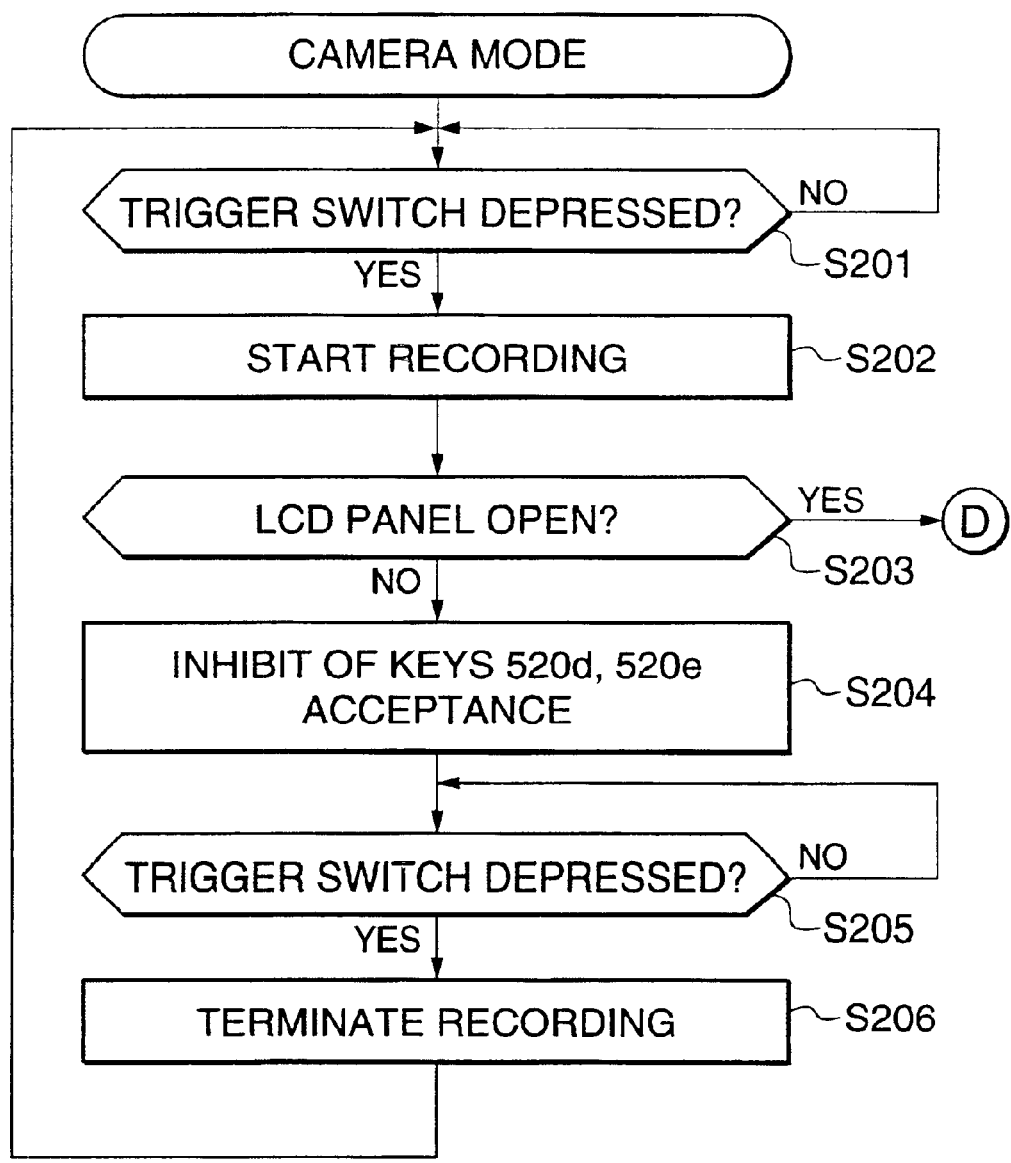
FIG. 9 is a flow chart showing a procedure carried out in camera mode in the video camera in FIG. 7.

FIG. 7 is a block diagram depicting the internal configuration of a video camera 100 according to the second embodiment; FIG. 8 is a diagram showing a state transition of display control when a reproduction request is issued in camera mode in the video camera 100 of FIG. 7; and FIG. 9 is a flow chart showing a procedure carried out in camera mode in the video camera 100 of FIG. 7. In the figures, blocks and component parts corresponding to those in FIG. 1 are designated by identical reference numerals.

In the second embodiment, the basic photographing and reproducing operations are identical to those in the first embodiment. The video camera 100 according to the second embodiment, as illustrated in FIG. 7, is distinguished from the video camera 100 according to the first embodiment in FIG. 1 in that there are additionally provided an infrared remote control unit 520 that controls the video camera 100 using infrared ray as transmitting medium and an infrared signal receiving section 521 that receives a infrared (IR) signal from the infrared remote control unit 520 and generates a corresponding control code. The control code generated by the infrared signal receiving section 521 is inputted to the microcomputer 107.

The infrared remote control unit 520 has all keys corresponding to the operating keys provided in the main body of the video camera 201 except for the mode dial 206. Therefore, unlike the first embodiment, when recording is in progress with the liquid crystal panel 208 closed, it is possible that reproduction of the image data is requested in parallel with recording by operating keys 520e or 520d in the infrared remote control unit 520, which corresponds to the camera-mode reproduction key 115e or the index key 115d.

Therefore, in the second embodiment, when image data and audio data are being recorded with the liquid panel 208 closed, the microcomputer 107 inhibits the operation of the corresponding key 520d or 520e in the infrared remote control unit 520 from being accepted.

More specifically, the camera mode includes a standby state 801, in which no shooting (recording) is performed, and a shooting state 804, in which a captured image is being recorded, as shown in FIG. 8. Transition from the standby state 801 to the shooting state 804 is triggered by an instruction to start shooting, and transition from the shooting state 804 to the standby state 801 is triggered by an instruction to stop shooting.

The standby state 801 includes a state 802 in which the liquid crystal panel 208 is open, and a state 803 in which the liquid crystal panel 208 is closed, while the shooting state 804 also includes a state 805 in which the liquid crystal panel is open, and a state 806 in which the liquid crystal panel is closed.

The microcomputer 107 controls the image input selecting switch 111 so that, in the standby state 801, image data obtained by the image pickup section 202 is fed to the liquid crystal panel 208 to be displayed thereon when the liquid crystal panel 208 is open while image data obtained by the image pickup section 202 is fed to an EVF 204 to be displayed thereon when the liquid crystal panel 208 is closed. It should be noted that the second embodiment is not intended to reproduce the coded data rows from the disk 108 in the standby state 801, and in the standby state 801, the microcomputer 107 disables the operation of the camera-mode reproduction key 115e or the index key 115d, or the operation of the key 520e or the key 520d corresponding thereto in the infrared remote control unit 520.

In addition, when the liquid crystal panel 208 is closed in the shooting state 804, the microcomputer 107 inhibits the operation of the keys 520d and 520e in the infrared remote control unit 520 from being accepted so that the coded data row from the disk 108 cannot be reproduced in parallel with recording. Further, the microcomputer 107 controls the image input selecting switch 111 to feed the EVF 204 with image data from the image pickup section 202 to display the same as well as display on the EVF 204 a message stating that the operation of the keys 520d and 520e should not be accepted.

On the other hand, when the liquid crystal panel 208 is open in the shooting state 804, the microcomputer 107 allows the acceptance of the operation of the keys 520d and 520e in the infrared remote control unit 520. Therefore, the coded data row from the disk 108 can be reproduced in parallel with recording. Further in this state, the microcomputer 107 controls the image input selecting switch 111, as is the case with the first embodiment, such that when recording alone is being carried out, the image data obtained by the image pickup section 202 is fed to the liquid crystal panel 208 to be displayed thereon, and image data from the image pickup section 202 is fed to the EVF 104, while when the coded data row is reproduced in parallel with recording, image data from the image pickup section 202 is fed to the EVF 204 and the reproduced image data is fed to the liquid crystal display 208 to be displayed thereon.

Operations in camera mode of the second embodiment will be described below with reference to FIG. 9. FIG. 9 is a flow chart showing the operation of the microcomputer 107 in camera mode.

Once the camera mode is established, first in step S201, the operation of the trigger switch 205 is monitored, and if the trigger switch 205 is operated, it is determined that start of recording has been requested, and the process proceeds to step S202, where recording is started.

Then in step S203, it is determined whether the liquid crystal panel 208 is open, based on the detection signal from the panel open/closed detection switch 211. If the liquid crystal panel 208 is not determined to be open, or the liquid crystal panel 208 is closed, the process proceeds to step S204, where the operations of keys 520d and 520e in the infrared remote control unit 520 are inhibited from being accepted. The inhibition of the acceptance of the 520d and 520e key operations in the infrared remote control unit 520 further inhibits the reproduction of the coded data row in concurrence with recording with the liquid crystal panel 208 closed.

Then, the process goes to step S205, where the operation of the trigger switch 205 is waited for to instruct termination of recording, and if the trigger switch 205 is operated, a procedure for termination of recording is carried out. Then, the process returns to step S201 to get ready for the next start of recording.

On the other hand, if it is determined in the step S203 that the liquid crystal panel 208 is open, the power of the EVF 204 is turned off, and the power of the liquid crystal panel 208 is turned on. Then, the image input selecting switch 111 is controlled to cause both of the two channels to select and output image data from the camera signal processing section 103. The description of the procedure after this will be omitted since it will follow the identical procedure to the procedure from the step S103 onward shown in the flow chart of FIG. 5 in the first embodiment. In the procedure following this, reproduction in concurrence with recording can be achieved by operating the index key 115d, the camera-mode reproduction key 115e, or the switch 520d or 520e in the infrared remote control unit 520 (the keys corresponding to the index key 115d or the camera-mode reproduction key 115e in the infrared remote control unit 520).

As described above, in the second embodiment, when the liquid crystal panel is closed, a request for reproduction by the infrared remote control unit 520 is disabled during recording. As a result, malfunctioning of the camera can be avoided even if the infrared remote control unit 520 is operated.

Third Embodiment

Figure 10:
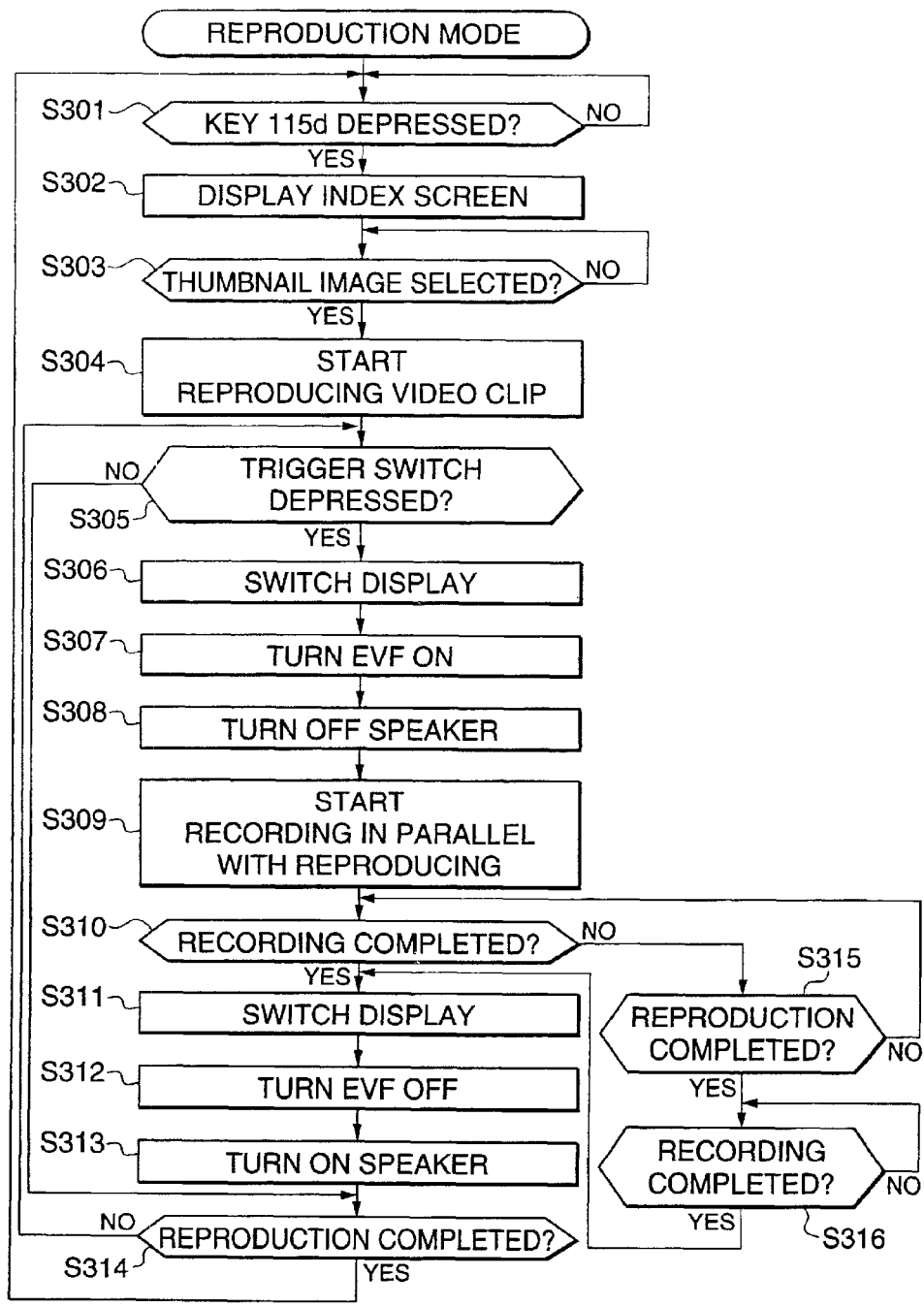
FIG. 10 is a flow chart showing a procedure carried out in reproduction mode in a video camera according to a third embodiment of the present invention.

A third embodiment of the present invention will be described below with reference to FIG. 10. A video camera according to the third embodiment also has a substantially identical configuration as well as basic operation to the video camera in FIG. 1 of the first embodiment. FIG. 10 is a flow chart showing a control procedure of the microcomputer 107 in reproduction mode of the video camera according to the third embodiment.

In the third embodiment, image data from the image pickup section 202 and audio data from the microphone unit 104 can be recorded concurrently with reproduction of coded data row from the disk 108 during the reproducing operation of the coded data row. To allow the recording operation during the reproduction of the coded data from the disk, the image input selecting switch 111 is controlled to switch images to be displayed so as to feed the image data from the image pickup section 202 to the EVF 204 to display the same and feed the reproduced image data to the liquid crystal panel 208 to display the same, as well as turn off the speaker to inhibit the reproduced audio sound from being outputted.

When recording is started by a user, the reproduction mode is selected using the mode dial 206, and the liquid crystal panel 208 is folded out.

The microcomputer 107 recognizes that the liquid crystal panel 208 has been opened, based on the detection signal from the panel open/closed detection switch 211, turns off the power of the EVF 204 and turns on the power of the liquid crystal panel 208. The microcomputer also controls the input image selecting switch 111 to feed the reproduced image data to the liquid crystal panel 208 to display the same.

Once the above conditions are established, the flow in FIG. 10 is started.

First, in step S301, the operation of the index key 115d is monitored, and if the index key 115d is operated, or depressed, the process proceeds to step S302. In the step S302, the disk control section 106 is controlled to reproduce index image data from the disk 108, process the index image data through the expanding section 109, and feed the processed data to the liquid crystal panel 208 to display an index screen image as shown in FIG. 4.

In the following step S303, selection of a thumbnail image corresponding to the video clip to be reproduced on the index screen is waited for, and when the thumbnail image corresponding to the video clip is selected, the process proceeds to step S304. In the step S304, the disk control section 106 is controlled to start reproducing the video clip corresponding to the selected thumbnail image. The reproduced image data is also fed to the liquid crystal panel 208 to be displayed thereon.

Then, the process proceeds to step S305, where it is determined whether the trigger switch 205 has been operated, or depressed. If the trigger switch 305 has been operated, it is determined that start of recording has been requested, and the process proceeds to step S306, where the image input selecting switch 111 is controlled to switch images to be displayed so as to feed the image data from the camera signal processing section 103 to the EVF 204 to display the same while continuing to display the reproduced image on the liquid crystal panel 208.

In step S307, the EVF 204 is turned on. Then in step S308, the speaker 209 of the speaker unit 114 is turned off to inhibit the reproduced sound from being recorded. At this time, the reproduced audio data is outputted through the external output terminal 213 of the speaker unit 114.

Then, the process proceeds to step S309, where recording is started in parallel with the reproduction of the video clip corresponding to the selected thumbnail image. In this state, the image data obtained by the image pickup section 202 is fed to the EVF 204 to be displayed thereon and the reproduced image is displayed on the liquid crystal panel 208. This permits recording of image data and audio data to be performed while viewing a reproduced image to thereby enable the user to confirm the object image being recorded.

Then in step 310, it is determined whether the recording operation has been completed. This determination is made based on whether the trigger switch 205 has been operated. When the recording operation is completed, the process proceeds to step S311, where the image input selecting switch 111 is controlled to stop supplying the EVF 204 with the image data from the camera signal processing section 103 while continuing to allow the reproduced image to be displayed on the liquid crystal panel 208, and then the power of the EVF 204 is turned off in step S312.

In step S313, it is determined that the recording operation has been completed and there is no reproduced sound to be recorded, and then the speaker 209 of the speaker unit 114 is turned on to output the reproduced audio data.

Then, the process proceeds to step S314, where it is determined whether the reproduction of the selected video clip has been completed, and if the reproduction has not been completed yet, the process goes back to the step S305 to prepare for the next recording. On the other hand, if the reproduction has been completed, the process returns to the step S301 to prepare for the next reproduction.

If in the step S310, it is determined that the recording has not been completed yet, the process proceeds to step S315, where it is determined whether the reproduction has been completed, and if the reproduction is not complete, the process returns to the step S310. On the other hand, when the reproduction of the video clip is completed, the flow goes to step S316, where completion of the recording is waited for. When the recording is completed, the process proceeds to the step S311, where feeding of the image data from the camera signal processing section 103 to the EVF 204 is stopped, the power of the EVF 204 is turned off, and the power of the speaker 209 of the speaker unit 114 is also turned on.

Further, if in the step S305, it is determined that the trigger switch 205 has not been operated, the process goes to the step S314.

As described above, according to the present embodiment, it is designed such that image data and audio data are recorded while a reproducing operation is performed in response to an instruction to start recording during reproduction of coded data row from the disk 108. As a result, for example, if a desired object appears during reproduction of a video clip stored in the disk 108 when the user is checking the contents being reproduced, the desired object can be captured and recorded immediately without interrupting the reproduction.

In this situation, since the reproduced image is displayed on the liquid crystal panel 208 whereas the captured image being recorded is displayed on the EVF 204, shooting of the object can be carried out while easily visually confirming the object.

Furthermore, since the output of the reproduced sound from the speaker 209 is inhibited in response to the recording instruction, even if sound is recorded during the reproducing operation, it can be avoided that the reproduced sound is recorded by accident.

The present invention can also be achieved by supplying an apparatus with a storage medium storing software program code for performing the functions of each of the above described embodiments (inclusive of the flow charts shown in FIG. 5, FIG. 6, FIG. 9 and FIG. 10), causing a computer (or CPU or MPU) of the apparatus to read and execute the program code stored in the storage medium.

In this case, the program code itself read out from the storage medium realizes the functions of the above described embodiments, and the storage medium storing the program code constitutes the present invention.

The storage medium for recording the program code may be a floppy (registered trademark) disk, a hard disk, an optical memory disk, a magneto-optical disk, a CD-ROM, a CD-R, a DVD-ROM, a magnetic tape, a nonvolatile memory card, or a ROM, for instance.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

What is claimed is:

1. An imaging apparatus comprising:
   image pickup means;
   recording means for recording a first image signal obtained by said image pickup means on a randomly accessible recording medium;
   reproducing means capable of reproducing a second image signal recorded at a random location on said recording medium while the first image signal is being recorded on said recording medium by said recording means;
   first display means;
   second display means; and
   control means for controlling said recording means and said reproducing means such that the second image signal recorded at a random location on said recording medium is reproduced while the first image signal obtained by said image pickup means is being recorded, said control means further controlling said first display means and said second display means such that one of said first display means and said second display means displays a first image according to the first image signal obtained by said image pickup means and the other displays a second image according to the second image signal reproduced by said reproducing means.

2. An imaging apparatus as claimed in claim 1, wherein the apparatus has a main body, and said first display means comprises one of an electronic viewfinder and a liquid crystal display means foldably attached to the main body of the apparatus, and said second display means comprises the other.

3. An imaging apparatus as claimed in claim 2, wherein said control means controls said liquid crystal display means to display the second image while controlling said electronic viewfinder to display the first image.

4. An imaging apparatus as claimed in claim 2, further comprising movement detecting means for detecting whether said liquid crystal display means has been moved into a viewing position in which an image displayed by said liquid crystal display means is visible,
   wherein said control means is responsive to said movement detecting means detecting that said liquid crystal display means has not been moved into said viewing position, for inhibiting the second image from being displayed while the first image signal is being recorded.

5. An imaging apparatus as claimed in claim 2, further comprising movement detecting means for detecting whether said liquid crystal display means has been moved into a viewing position in which an image displayed by said liquid crystal display means is visible,
   wherein said control means is responsive to said movement detecting means detecting that said liquid crystal display means has not been moved into said viewing position, for inhibiting said reproducing means from reproducing the second image signal while the first image signal is being recorded.

6. An imaging apparatus as claimed in claim 1, further comprising selecting means for selecting an image signal to be displayed on said first display means and an image signal to be displayed on said second display means out of the first image signal obtained by said image pickup means and the second image signal reproduced by said reproducing means.

7. An imaging apparatus as claimed in claim 1, wherein said control means is responsive to an instruction to start reproduction while the first image signal obtained by said image pickup means is being recorded on said recording medium, for controlling said first display means and said second display means such that an image to be displayed on said first display means is switched from the first image to the second image and the first image is displayed on said second display means.

8. An imaging apparatus as claimed in claim 7, wherein said control means controls said reproducing means to automatically stop reproduction of the second image signal recorded on said recording medium a predetermined period of time after issuance of the instruction to start reproduction.

9. An imaging apparatus as claimed in claim 1, wherein said control means is responsive to an instruction to stop reproduction of the second image signal recorded on said recording medium, for controlling said first display means and said second display means such that said second display means stops displaying the first image and an image to be displayed on said second display means is switched from the second image to the first image.

10. An imaging apparatus comprising:
    image pickup means;
    a microphone for capturing audio information;
    recording means for recording a first image signal obtained by said image pickup means and audio information captured by said microphone on a randomly accessible recording medium;
    reproducing means capable of reproducing a second image signal and audio information corresponding to the second image signal recorded at a random location on said recording medium while the first image signal is being recorded on said recording medium by said recording means;
    audio output means for externally outputting the audio information reproduced by said reproducing means; and
    control means for controlling said audio output means to inhibit the audio information reproduced by said reproducing means from being externally outputted while the first image signal is being recorded by said recording means.

11. An imaging apparatus as claimed in claim 10, wherein said audio output means comprises a speaker for outputting the reproduced audio information, and an external output terminal for externally outputting the audio information, and wherein said control means controls said audio output means to inhibit the audio information reproduced by said reproducing means from being outputted by said speaker while the first image signal is being recorded by said recording means and to permit the reproduced audio information to be outputted from said external output terminal.

12. A video camera comprising:

image pickup means;

recording means for recording a first image signal obtained by said image pickup means on a randomly accessible recording medium;

reproducing means for reproducing a second image signal recorded on said recording medium;

recording start instructing means for instructing start of recording the first image signal obtained by said image pickup means on said recording medium; and control means responsive to an instruction to start recording from said recording start instructing means during reproduction of the second image signal recorded on said recording medium by said reproducing means, for controlling said recording means and said reproducing means such that recording of the first image signal obtained by said image pickup means is started by said recording means while the reproduction by said reproducing means is continued.

13. A video camera as claimed in claim 12, further comprising reproduction start instructing means for instructing start of reproduction of the second image signal recorded on said recording medium, wherein said control means is responsive to an instruction to start reproduction by said reproduction start instructing means during recording of the second image signal, for controlling said recording means and said reproducing means such that the second image signal recorded a predetermined period of time before is reproduced from said recording medium while recording of the first image signal by said recording means is continued.

14. A video camera as claimed in claim 13, further comprising:

first display means; and second display means, and wherein said control means controls said first display means and said second display means such that one of said first display means and said second display means displays a first image according to the first image signal obtained by said image pickup means and the other displays a second image according to the second image signal reproduced by said reproducing means.

15. A video camera as claimed in claim 14, wherein the video camera has a main body, and said first display means comprises one of an electronic viewfinder and a liquid crystal display means foldably attached to the main body of the video camera, and said second display means comprises the other.

16. A video camera as claimed in claim 15, wherein said control means controls said liquid display means to display an image according to the second image signal reproduced by said reproducing means while controlling said electronic view finder to display an image according to the first image signal obtained by said image pickup means.

17. A video camera as claimed in claim 12, further comprising a microphone for capturing audio information, and audio output means for externally outputting the audio information, and wherein said recording means records the audio information captured by said microphone on said recording medium in correspondence with the first image signal, and said reproducing means reproduces the audio information recorded on said recording medium together with the second image signal corresponding thereto, and wherein said control means controls said audio output means to inhibit the audio information reproduced by said reproducing means from being externally outputted while the first image signal is being recorded by said recording means.

18. A video camera as claimed in claim 17, wherein said audio output means comprises a speaker for outputting the reproduced audio information, and an external output terminal for externally outputting the audio information, and wherein said control means controls said audio output means to inhibit the audio information reproduced by said reproducing means from being outputted by said speaker while the first image signal is being recorded by said recording means and to permit the reproduced audio information to be outputted from said external output terminal.

19. A method of reproducing recorded information, executed by an imaging apparatus comprising image pickup means;

recording means for recording a first image signal obtained by said image pickup means on a randomly accessible recording medium, reproducing means capable of reproducing a second image signal recorded at a random location on said recording medium while the first image signal is being recorded on said recording medium by said recording means, first display means, and second display means, the method comprising the steps of:

controlling said recording means and said reproducing means such that the second image signal recorded at a random location on said recording medium is reproduced while the first image signal obtained by said image pickup means is being recorded; and controlling said first display means and said second display means such that one of said first display means and said second display means displays a first image according to the first image signal obtained by said image pickup means and the other displays a second image according to the second image signal reproduced by said reproducing means.

20. A method as claimed in claim 19, wherein the apparatus has a main body, and said first display means comprises one of an electronic viewfinder and a liquid crystal display means foldably attached to the main body of the apparatus, and said second display means comprises the other.

21. A method as claimed in claim 20, comprising the step of controlling said liquid crystal display means to display the second image while controlling said electronic viewfinder to display the first image.

22. A method as claimed in claim 20, comprising the steps of detecting whether said liquid crystal display means has been moved into a viewing position in which an image displayed by said liquid crystal display means is visible, and inhibiting the second image from being displayed while the first image signal is being recorded, in response to it being detected that said liquid crystal display means has not been moved into said viewing position.

23. A method as claimed in claim 20, comprising the steps of:

detecting whether said liquid crystal display means has been moved into a viewing position in which an image displayed by said liquid crystal display means is visible; and inhibiting said reproducing means from reproducing the second image signal while the first image signal is being recorded, in response to it being detected that said liquid crystal display means has not been moved into said viewing position.

24. A method as claimed in claim 19, further comprising the step of selecting an image signal to be displayed on said first display means and an image signal to be displayed on said second display means out of the first image signal obtained by said image pickup means and the second image signal reproduced by said reproducing means.

25. A method as claimed in claim 19, comprising the step of controlling said first display means and said second display means such that an image to be displayed on said first display means is switched from the first image to the second image and the first image is displayed on said second display means, in response to an instruction to start reproduction while the first image signal obtained by said image pickup means is being recorded on said recording medium.

26. A method as claimed in claim 25, comprising the step of controlling said reproducing means to automatically stop reproduction of the second image signal recorded on said recording medium a predetermined period of time after issuance of the instruction to start reproduction.

27. A method as claimed in claim 19, comprising the step of controlling said first display means and said second display means such that said second display means stops displaying the first image and an image to be displayed on said second display means is switched from the second image to the first image, in response to an instruction to stop reproduction of the second image signal recorded on said recording medium.

28. A method of reproducing recorded information executed by an imaging apparatus comprising image pickup means, a microphone for capturing audio information, recording means for recording a first image signal obtained by said image pickup means and audio information captured by said microphone on a randomly accessible recording medium, reproducing means capable of reproducing a second image signal and audio information corresponding to the second image signal recorded at a random location on said recording medium while the first image signal is being recorded on said recording medium by said recording means, and audio output means for externally outputting the audio information reproduced by said reproducing means, the method comprising the step of controlling said audio output means to inhibit the audio information reproduced by said reproducing means from being externally outputted while the first image signal is being recorded by said recording means.

29. A method as claimed in claim 28, wherein wherein said audio output means comprises a speaker for outputting the reproduced audio information, and an external output terminal for externally outputting the audio information, the method comprising the step of controlling said audio output means to inhibit the audio information reproduced by said reproducing means from being outputted by said speaker while the first image signal is being recorded by said recording means and to permit the reproduced audio information to be outputted from said external output terminal.

30. A method of reproducing recorded information executed by a video camera comprising image pickup means, recording means for recording a first image signal obtained by said image pickup means on a randomly accessible recording medium, reproducing means for reproducing a second image signal recorded on said recording medium, and recording start instructing means for instructing start of recording the first image signal obtained by said image pickup means on said recording medium, the method comprising the step of controlling said recording means and said reproducing means such that recording of the first image signal obtained by said image pickup means is started by said recording means while the reproduction by said reproducing means is continued, in response to an instruction to start recording from said recording start instructing means during reproduction of the second image signal recorded on said recording medium by said reproducing means.

31. A method as claimed in claim 30, wherein said video camera further comprises reproduction start instructing means for instructing start of reproduction of the second image signal recorded on said recording medium, the method further comprising the step of controlling said recording means and said reproducing means such that the second image signal recorded a predetermined period of time before is reproduced from said recording medium while recording of the first image signal by said recording means is continued, in response to an instruction to start reproduction by said reproduction start instructing means during recording of the second image signal.

32. A method as claimed in claim 31, wherein said video camera further comprises first display means, and second display means, the method comprising the step of controlling said first display means and said second display means such that one of said first display means and said second display means displays a first image according to the first image signal obtained by said image pickup means and the other displays a second image according to the second image signal reproduced by said reproducing means.

33. A method as claimed in claim 32, wherein the video camera has a main body, and said first display means comprises one of an electronic viewfinder and a liquid crystal display means foldably attached to the main body of the video camera, and said second display means comprises the other.

34. A method as claimed in claim 33, comprising the step of controlling said liquid display means to display an image according to the second image signal reproduced by said reproducing means while controlling said electronic view finder to display an image according to the first image signal obtained by said image pickup means.

35. A method as claimed in claim 30, wherein said video camera further comprises a microphone for capturing audio information, and audio output means for externally outputting the audio information, and wherein said recording means records the audio information captured by said microphone on said recording medium in correspondence with the first image signal, the method comprising the steps of controlling said reproducing means to reproduce the audio information recorded on said recording medium together with the second image signal corresponding thereto, and controlling said audio output means to inhibit the audio information reproduced by said reproducing means from being externally outputted while the first image signal is being recorded by said recording means.

36. A method as claimed in claim 35, wherein said audio output means comprises a speaker for outputting the reproduced audio information, and an external output terminal for externally outputting the audio information, the method comprising the step of controlling said audio output means to inhibit the audio information reproduced by said reproducing means from being outputted by said speaker while the first image signal is being recorded by said recording means and to permit the reproduced audio information to be outputted from said external output terminal.

* * * * *